US009813441B2

(12) United States Patent
Adams

(10) Patent No.: US 9,813,441 B2
(45) Date of Patent: *Nov. 7, 2017

(54) DETECTING AND BREAKING CAPTCHA AUTOMATION SCRIPTS AND PREVENTING IMAGE SCRAPING

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,552

(22) Filed: Dec. 17, 2015

(65) Prior Publication Data

US 2016/0105458 A1    Apr. 14, 2016

Related U.S. Application Data

(63) Continuation of application No. 14/147,187, filed on Jan. 3, 2014, now Pat. No. 9,223,997.

(51) Int. Cl.
*H04L 9/00* (2006.01)
*H04L 29/06* (2006.01)
(Continued)

(52) U.S. Cl.
CPC ........ *H04L 63/1441* (2013.01); *G06F 21/554* (2013.01); *G06F 21/62* (2013.01);
(Continued)

(58) Field of Classification Search
CPC . H04L 63/1441; H04L 63/1416; H04L 63/08; G06F 21/62; G06F 21/554
See application file for complete search history.

(56) References Cited

U.S. PATENT DOCUMENTS 8,132,255 B2    3/2012  Mates
8,489,399 B2    7/2013  Gross
(Continued)

FOREIGN PATENT DOCUMENTS

CN    101615250 A    12/2009
CN    102257466 A    11/2011
(Continued)

OTHER PUBLICATIONS

Hindle et al., "Reverse Engineering CAPTCHAs", 15th Working Conference on Reverse Engineering, Oct. 15-18, 2008, 10 pages.
(Continued)

*Primary Examiner* — Beemnet Dada
(74) *Attorney, Agent, or Firm* — Harrity & Harrity, LLP

(57) ABSTRACT

A security device may receive a request from a client device and intended for a server device. The security device may identify the request as being associated with a malicious activity. The malicious activity may include one or more undesirable tasks directed to the server device. The security device may generate a challenge-response test based on identifying the request as being associated with the malicious activity. The challenge-response test may be generated using one or more construction techniques. The security device may provide the challenge-response test to the client device. The security device may receive, from the client device, a proposed solution to the challenge-response test. The security device may identify the proposed solution as being generated using an optical character recognition (OCR) program. The security device may protect the server device from the client device based on identifying the solution as being generated using an OCR program.

20 Claims, 9 Drawing Sheets

(51) Int. Cl.
*G06F 21/55* (2013.01)
*G06F 21/62* (2013.01)

(52) U.S. Cl.
CPC .......... *H04L 63/08* (2013.01); *H04L 63/1416* (2013.01); *G06F 2221/2103* (2013.01); *G06F 2221/2133* (2013.01)

(56) References Cited

U.S. PATENT DOCUMENTS

| | | | |
|---|---|---|---|
| 8,490,162 B1* | 7/2013 | Popoveniuc | G06F 21/316 713/182 |
| 8,631,467 B2 | 1/2014 | D'Urso | |
| 9,223,997 B2 | 12/2015 | Adams | |
| 2008/0127302 A1 | 5/2008 | Qvarfordt et al. | |
| 2009/0113294 A1 | 4/2009 | Sanghavi et al. | |
| 2010/0162357 A1 | 6/2010 | Chickering et al. | |
| 2010/0192201 A1* | 7/2010 | Shimoni | G06F 21/55 726/3 |
| 2012/0090030 A1 | 4/2012 | Rapaport et al. | |
| 2012/0324113 A1 | 12/2012 | Prince et al. | |
| 2013/0042311 A1 | 2/2013 | Broder et al. | |
| 2013/0276125 A1 | 10/2013 | Bailey | |
| 2014/0250538 A1 | 9/2014 | Rapaport et al. | |
| 2015/0095981 A1* | 4/2015 | Adams | H04L 63/1491 726/3 |

FOREIGN PATENT DOCUMENTS

| | | |
|---|---|---|
| DE | 202013100910 U1 | 4/2013 |
| EP | 2 330 529 A2 | 6/2011 |
| WO | WO 2010/055159 A2 | 5/2010 |
| WO | WO 2010/143152 A2 | 12/2010 |
| WO | WO 2012/107879 A2 | 8/2012 |

OTHER PUBLICATIONS

European Search Report corresponding to EP 14 20 0702 dated May 11, 2015, 7 pages.
M. Mehra et al., "Mitigating Denial of Service attack using CAPTCHA Mechanism," Proceedings of the International Conference and Workshop on Emerging Trends in Technology (ICWET), 2011, pp. 284-287.
Wikipedia, "CAPTCHA", http://en.wikipedia.org/wiki/CAPTCHA, Oct. 1, 2013, 8 pages.

* cited by examiner

DETECTING AND BREAKING CAPTCHA AUTOMATION SCRIPTS AND PREVENTING IMAGE SCRAPING

RELATED APPLICATION

This application is a continuation of U.S. patent application Ser. No. 14/147,187, filed Jan. 3, 2014 (now U.S. Pat. No. 9,223,997), which is incorporated herein by reference.

BACKGROUND

A completely automated public Turing test to tell computers and humans apart ("CAPTCHA") is a type of challenge-response test that may be used to determine whether a device (e.g., a computer device) is being operated by a user (e.g., a human) or by the computing device (e.g., an automated process being performed by the computing device). A CAPTCHA may require the user to correctly transcribe a group of distorted characters (e.g., letters) included in a CAPTCHA image (e.g., the computing device may be unable to identify the distorted characters).

SUMMARY

According to some possible implementations, a security device may receive a request from a client device and intended for a server device; identify the request as being associated with a malicious activity, where the malicious activity may include one or more undesirable tasks directed to the server device; generate a challenge-response test based on identifying the request as being associated with the malicious activity, where the challenge-response test may be generated using one or more construction techniques; provide the challenge-response test to the client device; receive, from the client device, a proposed solution to the challenge-response test; identify the proposed solution, provided by the client device, as being generated using an optical character recognition (OCR) program; and protect the server device from the client device based on identifying the solution as being generated using an OCR program.

According to some possible implementations, a computer-readable medium may store one or more instructions that, when executed by one or more processors, cause the one or more processors to: receive, from a client device, a request for information stored by a server device; determine that the request is indicative of a malicious activity, where the malicious activity may be associated with performance of an undesirable task directed to the server device; construct a completely automated public Turing test to tell computers and humans apart (CAPTCHA) based on determining the request is indicative of the malicious activity, where the CAPTCHA may being constructed using at least one construction technique; send the CAPTCHA to the client device; receive a solution to the CAPTCHA from the client device; determine that the solution was generated by an optical character recognition (OCR) tool; and protect the server device from the client device based on determining that the solution was generated by the OCR tool.

According to some possible implementations, a method may include: receiving, by a security device, a request to provide information associated with a server device; identifying, by the security device, the request as being associated with an undesirable task directed to the server device; generating, by the security device, a challenge-response test using a group of construction techniques, where each construction technique, of the group of construction techniques, may be configured to prevent an optical character recognition (OCR) script from generating a correct solution to the challenge-response test; providing, by the security device, the challenge-response test to a client device; receiving, by the security device, a submitted solution to the challenge-response test; identifying, by the security device, that the submitted solution was determined using an OCR script; and protecting, by the security device, the server device based on identifying that the submitted solution was determined using the OCR script.

DETAILED DESCRIPTION

The following detailed description of example implementations refers to the accompanying drawings. The same reference numbers in different drawings may identify the same or similar elements.

A security device, associated with a server device that hosts an application (e.g., a web application), may wish to prevent a script from automating a workflow associated with the application (e.g., a social networking website may wish to prevent a script from automatically creating fake user accounts). One method that may allow the security device to prevent the workflow from being automated is by presenting a challenge-response test (e.g., a CAPTCHA) to a client device engaging a malicious activity (e.g., an activity that indicates a script is being executed by the client device). However, the client device may be capable of solving the challenge-response test using an optical character recognition ("OCR") tool (e.g., without input from a human user).

Implementations described herein may allow a security device, associated with a server device that hosts an application, to generate a challenge-response test using one or more construction techniques intended to prevent an OCR tool from correctly solving the challenge-response test. Implementations described herein may also allow the security device to detect that the OCR tool was used to provide an incorrect solution to the challenge-response test (e.g., and the security device may protect the server device, accordingly).

Figure 1:
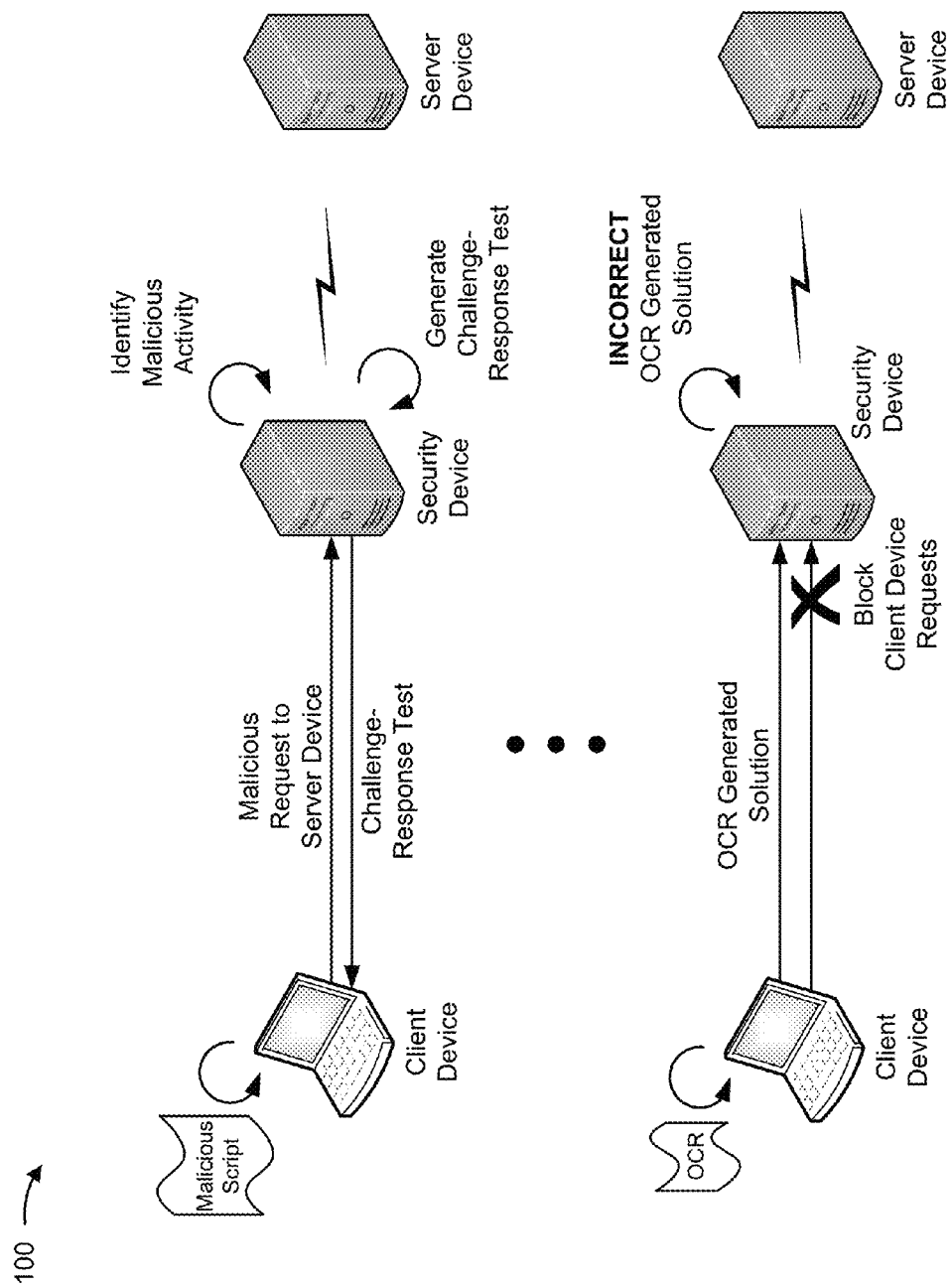
FIG. 1 is a diagram of an overview of an example implementation described herein.

FIG. 1 is a diagram of an overview of an example implementation 100 described herein. For the purposes of example implementation 100, assume that a client device is executing a malicious script that causes the client device to send malicious requests directed to a server device. Further, assume that the security device is configured to prevent the server device from receiving a malicious request from the client device (e.g., the security device will receive any request before the request is sent to the server device).

As shown in FIG. 1, the client device may send, to the security device, a malicious request directed to the server device. As shown, the security device may receive the request and may determine that the request indicates a malicious activity associated with the client device (e.g., the request may indicate that the client device is executing a malicious script). As further shown, the security device may generate a challenge-response test based on determining that the request indicates the malicious activity, and the security device may provide the challenge-response test to the client device.

As further shown in FIG. 1, the client device may receive the challenge-response test, may use an OCR tool to generate a solution to the challenge-response test, and may provide the OCR generated solution to the security device. As further shown, the security device may receive the OCR generated response, may determine that the solution is incorrect, and may determine that the solution was generated using an OCR tool. As shown, the security device may begin blocking any requests (e.g., directed to the server device) received from the client device. In this way, a security device may generate a challenge-response test based on identifying a malicious activity associated with a client device, and may determine that a solution to the challenge-response test (e.g., provided by the client device) was generated using an OCR tool. The security device may protect the server device from the client device based on determining that the solution was generated by the OCR tool.

Figure 2:
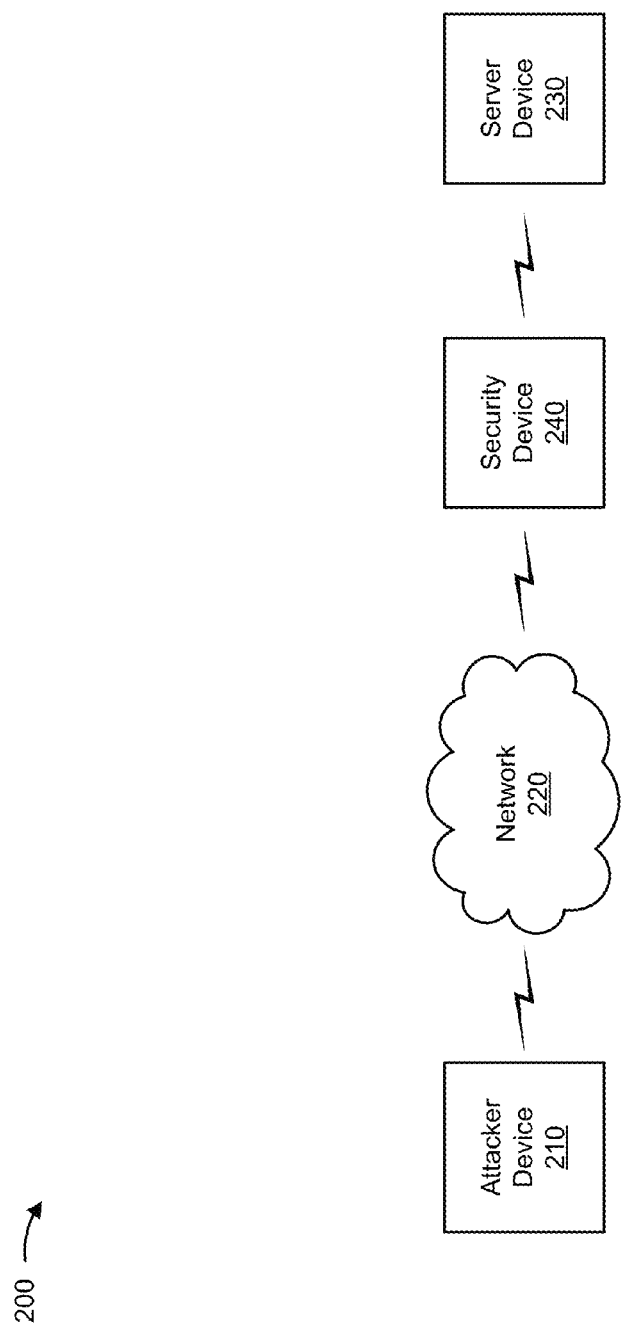
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a client device 210, a network 220, a server device 230, and a security device 240.

Client device 210 may include one or more devices capable of communicating with other devices (e.g., server device 230) via a network (e.g., network 220), and/or capable of receiving information provided by another device (e.g., server device 230). For example, client device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, client device 210 may be capable of generating and sending (e.g., to server device 230) a request (e.g., a request associated an application hosted by server device 230). Additionally, or alternatively, client device may be capable of executing a script that is configured to perform one or more tasks directed to server device 230. Additionally, or alternatively, client device 210 may be capable of executing an OCR tool that is configured to generate (e.g., without input from a user) and provide a solution to a challenge-response test.

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 220 may allow communication between devices, such as client device 210, server device 230, and/or security device 240.

Server device 230 may include one or more devices capable of receiving, providing, generating, storing, and/or processing information received and/or provided via a network (e.g., network 220) and/or another device (e.g., security device 240). For example, server device 230 may include a computing device, such as a server (e.g., an application server, a content server, a host server, a web server, etc.).

Security device 240 may include one or more devices capable of receiving, providing, generating, storing, and/or processing information received and/or provided via a network (e.g., network 220) and/or another device (e.g., server device 230, client device 210, etc.). For example, security device 240 may include a computing device, such as a server. In some implementations, security device 240 may receive information from and/or provide information to client device 210 (e.g., via network 220) and/or server device 230. Additionally, or alternatively, security device 240 may include one or more devices capable of processing and/or transferring communications (e.g., a request, a response, etc.) between client device 210 and server device 230. For example, security device 240 may include a network device, such as a reverse proxy, a server (e.g., a proxy server), a traffic transfer device, a firewall, a router, a load balancer, or the like.

In some implementations, security device 240 may be capable of identifying a malicious activity associated with a request (e.g., received from client device 210 and directed to server device 230). Additionally, or alternatively, security device 240 may be capable of generating a challenge-response test (e.g., a CAPTCHA) and evaluating a solution (e.g., receiving from client device 210) to the challenge-response test. Additionally, or alternatively, security device 240 may be capable of protecting server device 230 from a malicious activity associated with client device 210.

Security device 240 may be used in connection with a single server device 230 or a group of server devices 230 (e.g., a data center). Communications may be routed through security device 240 to reach the one or more server devices 230. For example, security device 240 may be positioned within a network as a gateway to a private network that includes one or more server devices 230.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
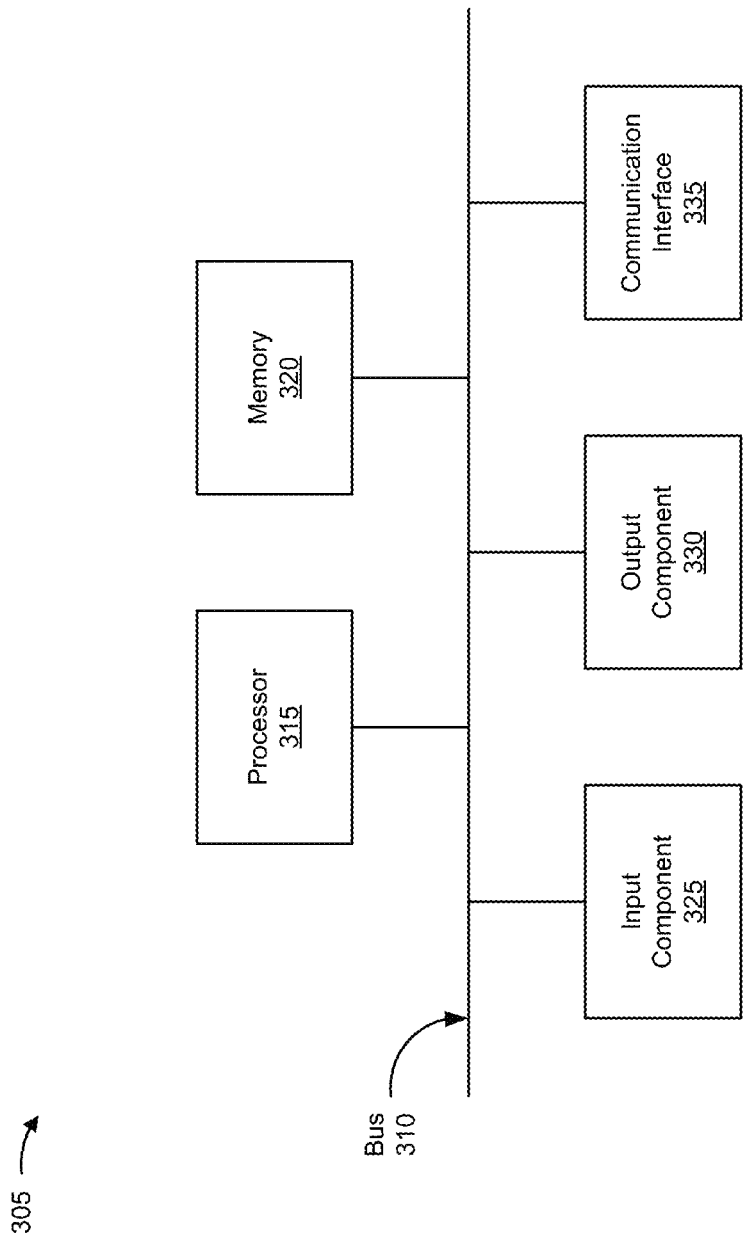
FIG. 3 is a diagram of example components of one or more devices of FIG. 2.

FIG. 3 is a diagram of example components of a device 300. Device 300 may correspond to client device 210, server device 230, and/or security device 240. Additionally, or alternatively, each of client device 210, server device 230, and/or security device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
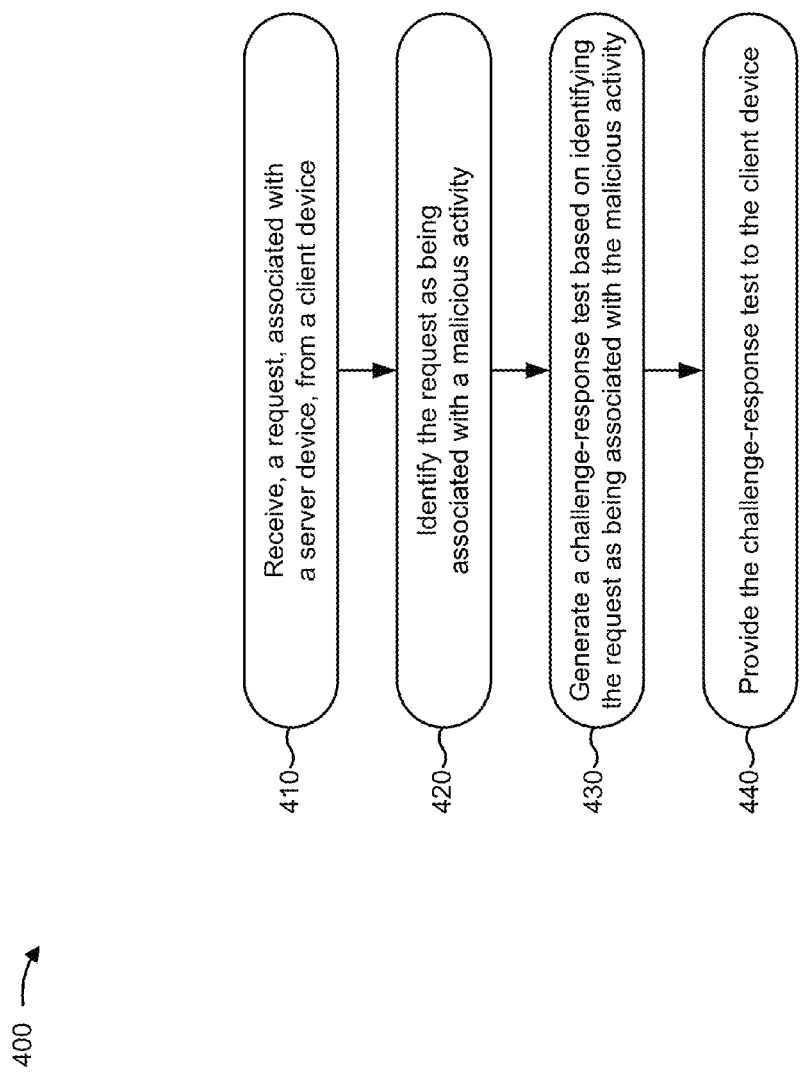
FIG. 4 is a flow chart of an example process for generating a challenge-response test based on detecting a malicious activity associated with one or more requests received from a client device.

FIG. 4 is a flow chart of an example process 400 for generating a challenge-response test based on detecting a malicious activity associated with one or more requests received from a client device. In some implementations, one or more process blocks of FIG. 4 may be performed by security device 240. In some implementations, one or more process blocks of FIG. 4 may be performed by another device or a group of devices separate from or including security device 240, such as server device 230.

As shown in FIG. 4, process 400 may include receiving a request, associated with a server device, from a client device (block 410). For example, security device 240 may receive a request, associated with server device 230, from client device 210. In some implementations, security device 240 may receive the request from client device 210 when client device 210 sends the request via network 220. In some implementations, security device 240 may receive the request before server device 230 receives the request (e.g., security device 240 may be positioned between client device 210 and server device 230 within network 220).

A request may include a message, sent from client device 210 to server device 230 (e.g., via security device 240 and/or network 220), that identifies a resource (e.g., a HyperText Markup Language ("HTML") file, an image file, a video file, an audio file, etc.) that client device 210 wishes to receive from server device 230. In some implementations, the request may be associated with a particular application protocol, such as HyperText Transfer Protocol ("HTTP"), HyperText Transfer Protocol Secure, File Transfer Protocol, or the like. For example, client device 210 may send an HTTP request for an HTML file associated with a web address (e.g., a uniform resource locator ("URL")) of a website hosted by server device 230.

In some implementations, the request may include information that identifies client device 210 (e.g., a string of characters that identifies client device, 210, a network address associated with client device 210, a port number associated with client device 210, etc.). Additionally, or alternatively, the request may include information that identifies server device 230 (e.g., a string of characters that identifies server device 230, a network address associated with server device 230, a port number associated with server device 230, a URL associated with a website hosted by server device 230, etc.). Additionally, or alternatively, the request may include information that identifies the resource requested by client device 210, such as a uniform resource identifier ("URI").

In some implementations, security device 240 may receive the request based on information included in the request. For example, security device 240 may receive the request based on a network address, associated with server device 230, included in the request (e.g., when security device 240 is positioned to receive requests destined for server device 230). As an additional example, security device 240 may receive the request based on information associated with a website (e.g., a URL) included in the request (e.g., when security device 240 is configured to receive requests associated with the website).

As further shown in FIG. 4, process 400 may include identifying the request as being associated with a malicious activity (block 420). For example, security device 240 may identify the request, received from client device 210, as being associated with a malicious activity. In some implementations, security device 240 may identify the request as being associated with the malicious activity when security device 240 receives the request from client device 210 (e.g., after security device 240 receives the request).

In some implementations, security device 240 may identify the request as being associated with the malicious activity based on information included in the request. For example, security device 240 may identify the request as being associated with the malicious activity based on information (e.g., a network address) that identifies client device 210 (e.g., when client device 210 is known to have engaged in malicious activity in the past). Additionally, or alternatively, security device 240 may identify the request as being associated with the malicious activity based on activity related to one or more other requests received from client device 210. For example, security device 240 may receive, from client device 210, a quantity of requests (e.g., a quantity of requests associated with several web pages on a website), which may be indicative of undesirable scripted activity (e.g., spidering, scraping, etc.). As an additional example, security device 240 may identify the request as being associated with a malicious activity based on receiving a quantity of requests that satisfies a threshold quantity of requests (e.g., when the quantity of requests received exceeds the threshold quantity of requests, security device 240 may identify the request as being associated with the malicious activity, etc.). As an another example, security device 240 may identify the request as being associated with a malicious activity based on receiving a quantity of requests within a particular threshold amount of time (e.g., when the quantity of requests are received within the threshold amount of time, security device 240 may identify the request as being associated with the malicious activity, etc.).

In some implementations, security device 240 may identify the request as being associated with the malicious activity based on receiving a request with a known attack signature (e.g., security device 240 may store information that identifies the known attack signature, and may recognize the attack signature based on the content of the request). In some implementations, security device 240 may identify the request as being associated with a malicious activity based on information associated with one or more previous requests (e.g., a server log stored by security device 240 and/or server device 230 that indicates that the request may be associated with the malicious activity).

In some implementations, security device 240 may identify the request as being associated with the malicious activity based on a probability, determined by security device 240, that the request is associated with the malicious activity. For example, security device 240 may determine (e.g., based on information associated with the request, based on information associated with client device 210, based on information associated with another request received from client device 210, etc.) a score, associated with the request, and the score may reflect a probability that the request is associated with the malicious activity. In this example, if the score satisfies a threshold, then security device 240 may identify the request as being associated with the malicious activity. Conversely, if the score does not satisfy the threshold, then security device 240 may not identify the request as being associated with the malicious activity.

In some implementations, security device 240 may store information based on identifying the request as being associated with the malicious activity, such as information that identifies client device 210 (e.g., a network address, etc.), information, associated with the request, used to identify the request as being associated with the malicious activity (e.g., a date the request was received, a time the request was received, etc.), or the like. In some implementations, security device 240 may not forward the request to server device 230 when security device 240 identifies the request as being associated with the malicious activity (e.g., security device 240 will stop the request from being sent to server device 230).

As further shown in FIG. 4, process 400 may include generating a challenge-response test based on identifying the request as being associated with the malicious activity (block 430). For example, security device 240 may generate a challenge-response test (e.g., a CAPTCHA) based on identifying the request, received from client device 210, as being associated with the malicious activity. In some implementations, security device 240 may generate the challenge-response test when security device 240 identifies the request as being associated with the malicious activity. Additionally, or alternatively, security device 240 may generate the challenge-response test when security device 240 receives information, indicating that security device 240 may generate the challenge-response test, from another device (e.g., server device 230).

A challenge-response test may include a type of authentication where one party (e.g., security device 240) presents a question (e.g., a "challenge") and another party (e.g., client device 210) is required to provide a valid solution (e.g., a "response") to be authenticated. An unsolvable challenge-response test may include a challenge-response test that does not have a correct solution and/or a challenge-response test where client device 210 may be incapable of providing the correct solution (e.g., when the correct solution includes a character that may not be typed using a standard keyboard, etc.).

In some implementations, security device 240 may generate the challenge-response test in the form of a CAPTCHA. In some implementations, security device 240 may generate the CAPTCHA using one or more construction techniques that are configured to prevent an OCR tool from determining the correct solution to the CAPTCHA. Additionally, or alternatively, security device 240 may generate the CAPTCHA such that the image, associated with the CAPTCHA, displayed to a user (e.g., of client device 210) indicates a solution (e.g., a correct solution) that differs from the solution that may be determined by the OCR tool.

A construction technique may include a manner in which the CAPTCHA is generated by security device 240. For example, security device 240 may construct the CAPTCHA by overlaying multiple images to create a composite CAPTCHA. In this example, each of the multiple images may contain only a portion of the CAPTCHA, and an underlying portion of each image may have a portion of false CAPTCHA information (e.g., the false CAPTCHA information may not be visible to a user viewing the composite CAPTCHA, but the false CAPTCHA information may be detected by an OCR tool attempting to solve the CAPTCHA).

As an additional example, security device 240 may construct the CAPTCHA by creating an animation using two or more images (e.g., each image may include only portion of the CAPTCHA, each image may include only a portion of the pixels associated with the CAPTCHA, etc.). In this example, only a portion of the CAPTCHA may be displayed at a particular time (e.g., such that an OCR tool taking a screenshot of the CAPTCHA would detect only the portion of the CAPTCHA being displayed), but the animation speed associated with the CAPTCHA may be sufficiently fast to allow the CAPTCHA to appear (e.g., to a user), as a constant image.

As an additional example, security device 240 may construct the CAPTCHA by generating a CAPTCHA that has a quantity of characters (e.g., 10 letters, numbers, symbols, etc.), and displaying only a subset of the quantity of characters (e.g., 6 letters, numbers, symbols, etc.) to the user. In this example, the subset of characters (e.g., that identifies the correct solution) included in the CAPTCHA may be visible to the user, while an OCR tool may detect the entire quantity of characters (e.g., and provide an incorrect solution containing the entire quantity of characters).

As an additional example, security device 240 may construct the CAPTCHA by overlaying a first CAPTCHA with a second CAPTCHA (e.g., a fake CAPTCHA) that may be hidden using a style sheet language (e.g., cascading style sheets ("CSS")). In this example, the style sheet language may cause the second CAPTCHA to be displayed when an OCR tool attempts to solve the CAPTCHA (e.g., when the OCR tool attempts to take a screenshot of the CAPTCHA, when the OCR tool attempts to save the CAPTCHA, etc.). In this example, the second CAPTCHA would contain an incorrect solution (e.g., the OCR tool would cause the incorrect solution to be submitted).

As an additional example, security device 240 may construct the CAPTCHA using multiple images that may be correctly assembled by client device 210 (e.g., using HTML and CSS). In this example, an OCR script would be required to assemble the multiple images in the proper order before determining a solution to the CAPTCHA (e.g., a solution that contains the characters include in a single image, of the multiple images, may indicate that the OCR tool was used to determine the solution).

As an additional example, security device 240 may construct the CAPTCHA using multiple image formats (e.g., using scalable vector graphics, using a scripted canvas, etc.). In this example, a first portion of the CAPTCHA may be generated using a first image format, a second portion of the CAPTCHA may be generated using a second image format, and so forth. An OCR tool attempting to determine the solution to the CAPTCHA may be unable to parse and assemble the multiple image formats (e.g., the OCR tool may not be able to determine the solution to the CAPTCHA).

As an additional example, security device 240 may construct the CAPTCHA by embedding a first CAPTCHA inside of a second CAPTCHA. In this example, the first CAPTCHA may appear as a watermark within the second CAPTCHA. The first CAPTCHA may include more defined edges (e.g., edges associated with characters included in the first CAPTCHA) than the second CAPTCHA, but may be displayed to a user such that the user may determine that the first CAPTCHA is not the solution to the CAPTCHA (e.g., the first CAPTCHA may appear as noise to the user). The second CAPTCHA may have less defined edges than the first CAPTCHA, but may be displayed to the user such that that user may determine that the second CAPTCHA is the solution to the CAPTCHA (e.g., an OCR tool attempting to solve the CAPTCHA may determine that second CAPTCHA is not the solution to the CAPTCHA based on the less defined edges and may submit the characters associated with the first CAPTCHA).

As an additional example, security device 240 may construct the CAPTCHA using a programming language (e.g., Javascript) to overlay a character into a blank area included in an incomplete CAPTCHA image. In this example, the overlaid character may represent a character included in the solution to the CAPTCHA, but the overlaid character may only be added to the image at runtime (e.g., an OCR tool that determines a solution to the CAPTCHA using an HTML file, associated with the CAPTCHA, to identify a URL of the CAPTCHA image would identify the incomplete CAPTCHA). A solution consisting only of the characters included in the incomplete CAPTCHA may indicate that an OCR tool was used to determine the solution.

As an additional example, security device 240 may construct the CAPTCHA by displaying an animated CAPTCHA including a first frame (e.g., a fake CAPTCHA) and a second frame (e.g., an actual CAPTCHA). In this example, the first frame may be sufficiently distorted and displayed for a short period of time (e.g., followed by the second frame) such that a user may not be capable of solving the CAPTCHA based on the first frame, and the user may submit a solution associated with the second frame (e.g., the actual CAPTCHA). However, an OCR tool attempting to determine the solution to the CAPTCHA may determine a solution based on the first frame (e.g., the fake CAPTCHA).

As an additional example, security device 240 may construct the CAPTCHA by creating a series of identical CAPTCHAs where only a portion of the entire CAPTCHA is visible in each CAPTCHA of the series (e.g., the remaining portion of the CAPTCHA may be blacked out). In this example, each CAPTCHA in the series of CAPTCHAs would leave a different portion visible, such that the entire CAPTCHA may be provided by the series of identical CAPTCHAs. A user may view each portion of the CAPTCHA (e.g., by mousing over each portion of the CAPTCHA to reveal each portion), but an OCR tool may not be able to obtain the entire CAPTCHA (e.g., by taking a screenshot, using each of the series of CAPTCHAs).

As an additional example, security device 240 may construct the CAPTCHA by including characters in two different colors, and overlaying a transparent layer onto the CAPTCHA that matches one of the colors. In this example, only the characters in the color not used by the overlay will be visible to the user (e.g., a submission including a character hidden by the matching overlay color indicates that an OCR tool was used to generate the submission).

As an additional example, security device 240 may construct the CAPTCHA by generating a two stage CAPTCHA. In this example, a first stage of the CAPTCHA may be designed to increase the complexity of CAPTCHA solving software (e.g., an OCR tool). For example, the first stage of the CAPTCHA may include an interactive game (e.g., a user may be required to click and drag a ball from a first location to a second location). A second stage of the CAPTCHA may appear only when client device 210 has completed the first stage of the CAPTCHA. As a result, an OCR tool may be unable to determine a solution to the CAPTCHA (e.g., where the OCR tool is not designed to complete the first stage of the CAPTCHA and cannot reach the second stage of the CAPTCHA).

As an additional example, security device 240 may construct the CAPTCHA by presenting multiple CAPTCHAs and asking client device 210 to solve a CAPTCHA associated with a specific background image. In this example, two or more CAPTCHAs, each associated with a different background, may be displayed, and client device 210 may be required to solve a CAPTCHA associated with a specific background. A submission associated with one or more of the CAPTCHAs associated with incorrect background images may indicate that an OCR tool was used to generate the solution.

As an additional example, security device 240 may construct the CAPTCHA by including an altered word (e.g., "imitaiton"), written in a home language associated with the user, that resembles a real word (e.g., "imitation"). The altered word may be displayed to the user for a short period of time (e.g., 1 second), and the user may be required to type the word. In this example, the user may enter the real word (e.g., since the altered word was only displayed for 1 second, the user may interpret the altered word as the real word), whereas an OCR tool may submit the altered word as the solution to the CAPTCHA.

As an additional example, security device 240 may construct the CAPTCHA that converts a character, entered by the user, to another character (e.g., using a static mapping technique). In this example, the user may type a group of first characters that may be visible in the CAPTCHA (e.g., "ABCD"), but the static mapping technique may cause the first group of characters to be changed to a second group of characters (e.g., "WXYZ"). In this case, the correct solution to the CAPTCHA may be the second group of characters. However, an OCR tool attempting to determine the solution to the CAPTCHA may submit the first group of characters (e.g., since the OCR tool would not apply the mapping technique), and may provide an incorrect solution to the CAPTCHA. A solution that includes the first group of characters may indicate that an OCR tool was used to generate the solution.

As an additional example, security device 240 may construct the CAPTCHA by modifying the requirements of entering the CAPTCHA solution. For example, the CAPTCHA may instruct (e.g., by displaying text) the user to submit characters associated with a specific attribute (e.g., by instructing the user to submit only characters of a particular color, by instructing the user to submit every other character, by instructing the user to capitalize all vowels, etc.). In this way the OCR tool may be unable to correctly determine the solution to the CAPTCHA (e.g., since the OCR tool may not be capable of interpreting the instructions).

In some implementations, security device 240 may generate the CAPTCHA in another manner (e.g., the listed construction techniques are not exhaustive of all possible construction techniques). In some implementations, security device 240 may store information associated with one or more construction techniques (e.g., security device 240 may store a data structure of possible construction techniques). In some implementations, security device 240 may generate the CAPTCHA using one or more construction techniques. Additionally, or alternatively, security device 240 may randomly select one or more construction techniques that are to be used to generate the CAPTCHA.

In some implementations, security device 240 may select one or more construction techniques based on information associated with client device 210. For example, security device 240 may store information indicating that client device 210 has previously engaged in a malicious activity, and security device 240 may select one or more construction techniques, accordingly (e.g., to increase the complexity of the CAPTCHA, to add randomness to the manner in which the CAPTCHA is generated, etc.).

In some implementations, the construction techniques described above may be implemented to protect an image (e.g., an image displayed on a website associated with server device 230) from being scraped and/or saved (e.g., by client device 210). For example, one or more of the above construction techniques may allow server device 230 to display an image to a user (e.g., when the user may purchase the image from the website), while preventing the user from saving the image (e.g., by scraping the image, by taking a screenshot of the image, etc.) without permission from server device 230.

As further shown in FIG. 4, process 400 may include providing the challenge-response to the client device (block 440). For example, security device 240 may provide the challenge-response test to client device 210. In some implementations, security device 240 may provide the challenge-response test to client device 210 when security device 240 generates the challenge-response test. Additionally, or alternatively, security device 240 may provide the challenge-response test to client device 210 when security device 240 receives information, indicating that security device 240 may provide the challenge-response test, from another device (e.g., server device 230). In some implementations, security device 240 may provide the challenge-response test to client device 210 via network 220.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
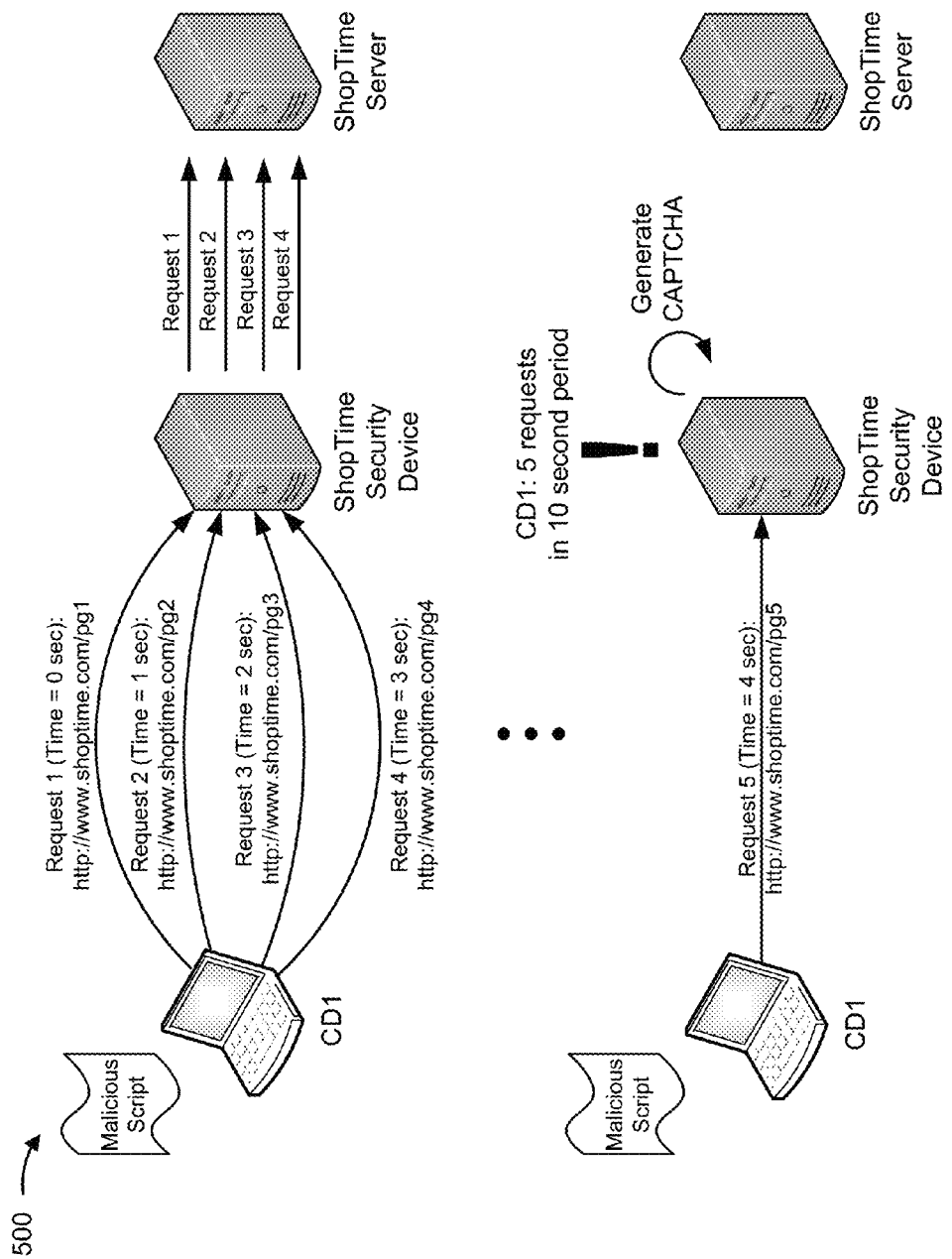
FIGS. 5A and 5B are diagrams of an example implementation relating to the example process shown in FIG. 4.
Figure 5B:
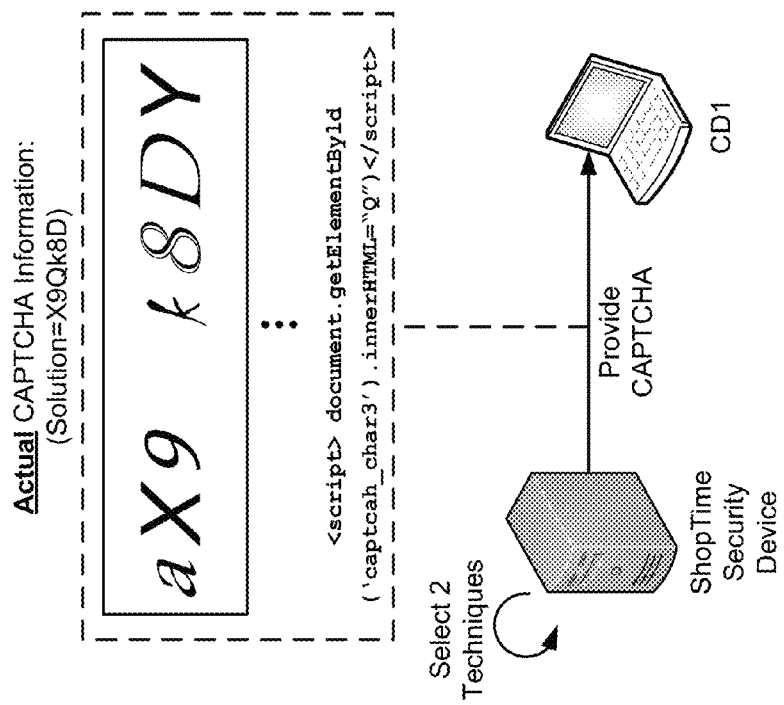

FIGS. 5A and 5B are diagrams of an example implementation 500 relating to example process 400 shown in FIG. 4. For the purposes of example implementation 500, assume that a client device, CD1, is running a malicious script that is configured to send requests to a server device (e.g., ShopTime server) associated with a ShopTime website for a malicious purpose (e.g., spidering). Further, assume that a security device, ShopTime security device, is positioned to protect the ShopTime server from malicious requests provided by CD1.

As shown in FIG. 5A, CD1 may run the malicious script that causes CD1 to send malicous requests, intended for the ShopTime server. As shown, CD1 may send, in a three second time period, four requests (e.g, request 1, request 2, request 3, and request 4) for four different web pages associated with a ShopTime website (http://www.shoptime.com/pg1, http://www.shoptime.com/pg2, http://www.shoptime.com/pg3, and http://www.shoptime.com/pg4). As shown, the ShopTime security device may forward the four requests to the ShopTime server (e.g., assume that the ShopTime security device has not yet identified the malicious activity associated with CD1).

As further shown, assume that the ShopTime security device is configured to identify a malicious activity based on receiving five or more requests during a ten second time period. As shown, CD1 may send a fifth request (e.g., request 5: http://www.shoptime.com/pg5) during a ten second time period (e.g., four seconds after request 1), and the ShopTime security device may determine that CD1 is engaging in a malicious activity. As further shown, the ShopTime security device may determine that a CAPTCHA will generated (e.g., and solved by client device 210) before request 5 is sent to the ShopTime server (e.g., to determine whether CD1 is being operated by a human).

As shown in FIG. 5B, the ShopTime security device may select two construction techniques (e.g., based on information stored by the ShopTime security device), and may generate a CAPTCHA to be provided to CD1. As shown, the CAPTCHA generated by the ShopTime security device may include a string of characters (e.g., "aX9 k8DY"), may include information associated with a script that is configured to display (e.g., in a gap included in the string of characters) another character (e.g., "Q"), and may include encrypted information that identifies the correct solution to the CAPTCHA (e.g., "X9Qk8D"). As shown, the ShopTime security device may provide the CAPTCHA to CD1.

As indicated above, FIGS. 5A and 5B are provided merely as an example. Other examples are possible and may differ from what was described with regard to FIGS. 5A and 5B.

Figure 6:
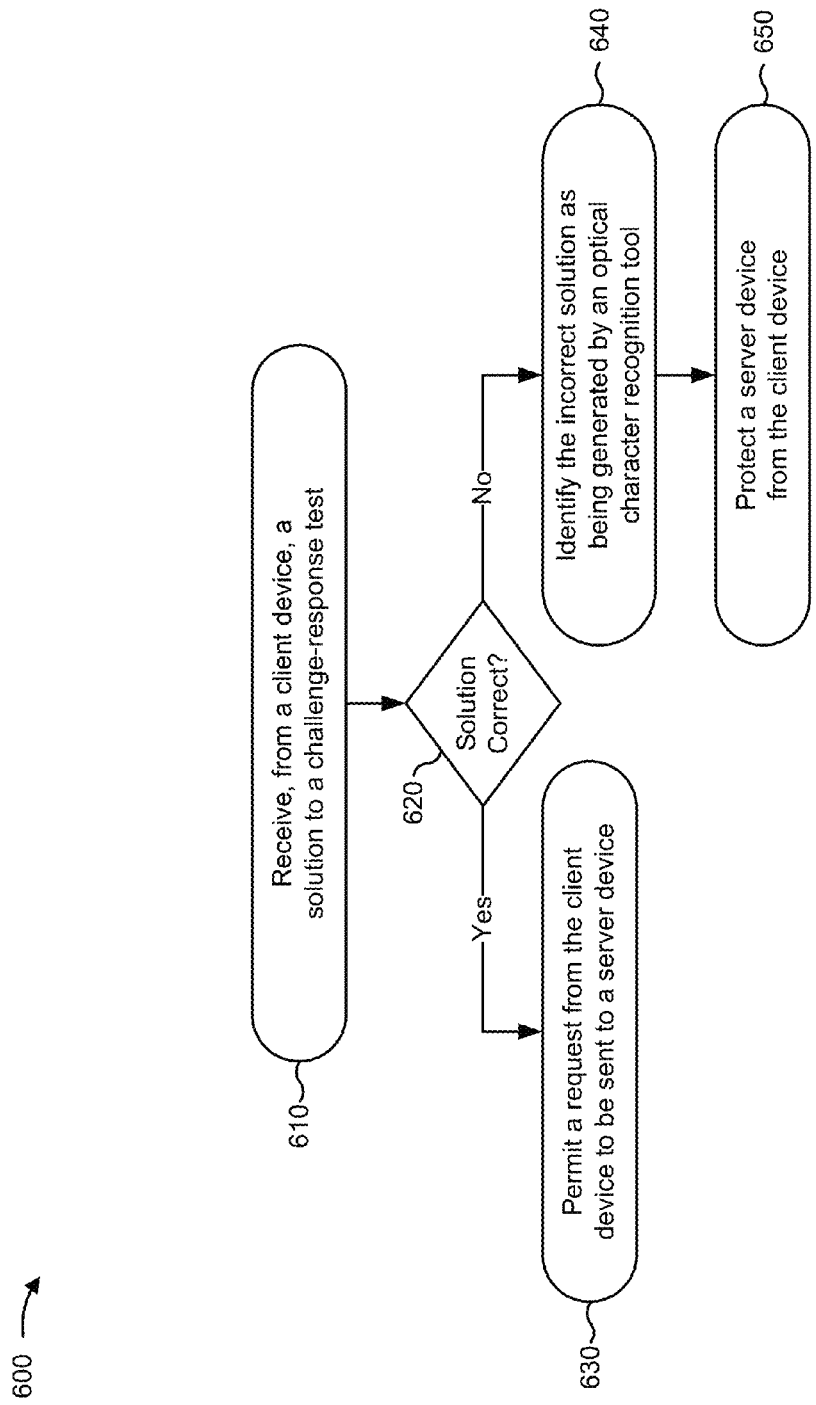
FIG. 6 is a flow chart of an example process for protecting a server device based on identifying a solution to a challenge-response test as being generated by an optical character recognition tool.

FIG. 6 is a flow chart of an example process 600 for protecting a server device based on identifying a solution to a challenge-response test as being generated by an optical character recognition tool. In some implementations, one or more process blocks of FIG. 6 may be performed by security device 240. In some implementations, one or more process blocks of FIG. 6 may be performed by another device or a group of devices separate from or including security device 240, such as server device 230.

As shown in FIG. 6, process 600 may include receiving, from a client device, a solution to a challenge-response test (block 610). For example, security device 240 may receive a solution to a challenge-response test (e.g., a challenge-response test generated by security device 240) provided by client device 210. In some implementations, security device 240 may receive the solution when client device 210 sends the solution. In some implementations, security device 240 may receive the response via network 220.

As further shown in FIG. 6, process 600 may include determining whether the solution to the challenge-response test is correct (block 620). For example, security device 240 may determine whether the solution, provided by client device 210, to the challenge-response test, generated by security device 240, is correct. In some implementations, security device 240 may determine whether the solution is correct when security device 240 receives the solution from client device 210. Additionally, or alternatively, security device 240 may determine whether the solution is correct when security device 240 receives information, indicating that security device 240 may determine whether the solution is correct, from another device (e.g., server device 230).

In some implementations, security device 240 may determine whether the solution is correct based on information stored by security device 240. For example, security device 240 may store (e.g., in a memory location associated with security device 240) information that identifies a correct solution to the challenge-response test, and security device 240 may determine whether the solution, provided by client device 210, matches the information that identifies the correct solution stored by security device 240.

Additionally, or alternatively, security device 240 may determine whether the solution is correct based on information received from client device 210. For example, security device 240 may receive the solution from client device 210, and the solution may include information (e.g., encrypted information) that identifies a correct solution to the challenge-response test (e.g., when the encrypted information is included in the challenge-response test generated by security device 240 and returned in the solution provided by client device 210). In this example, security device 240 may determine whether the solution, provided by client device 210, is correct based on the information that identifies the correct solution (e.g., the encrypted information), received from client device 210.

As further shown in FIG. 6, if the solution to the challenge-response test is correct (block 620—YES), then process 600 may include permitting a request form the client device to be sent to a server device (block 630). For example, security device 240 may determine that the solution to the challenge-response test is correct, and security device 240 may permit a request, from client device 210, to be sent to server device 230.

In some implementations, security device 240 may determine that the solution is correct, and may send, to client device 210, a notification indicating that the solution is correct. Additionally, or alternatively, security device 240 may send, to client device 210, information indicating that client device 210 may send a request to server device 230. Additionally, or alternatively, security device 240 may send information indicating that client device 210 may resend a previous request (e.g., a request that caused the CAPTCHA to be generated) to server device 230, may receive the previous request from client device 210, and may forward the previous request to server device 230.

In some implementations, security device 240 may receive an additional request from client device 210, may identify the additional request as being associated with the malicious activity, and may require client device 210 to provide a solution to another challenge-response test generated by security device 240. In this manner, security device 240 may continue to monitor requests received from client device 210, and may continue generating challenge-response tests (e.g., CAPTCHAs), as described above.

As further shown in FIG. 6, if the solution to the challenge-response test is not correct (block 620—NO), then process 600 may include identifying the incorrect solution as being generated by an optical character recognition tool (block 640). For example, security device 240 may identify the solution, received from client device 210, as being generated by an OCR tool. In some implementations, security device 240 may identify the solution as being generated by the OCR tool when security device 240 receives the solution from client device 210. Additionally, or alternatively, security device 240 may identify the solution as being generated by the OCR tool when security device 240 determines that the solution is incorrect. Additionally, or alternatively, security device 240 may identify the solution as being generated by the OCR tool after security device 240 determines a first solution and a second solution (e.g, submitted by client device 210) are incorrect. For example, security device 240 may allow client device 210 to submit the second solution (e.g., a second attempt to solve the challenge-response test) after security device 240 determines that the first solution is incorrect, may determine the second solution is incorrect, and may identify the first and/or second solution as being generated by the OCR tool.

In some implementations, security device 240 may identify the solution as being generated by the OCR tool based on information included in the solution. For example, security device 240 may determine that the solution is incorrect, and may determine that characters included in the solution (e.g., characters that may not have been displayed to the user but were included in the solution) are indicative of the OCR tool being used to generate the solution. Additionally, or alternatively, security device 240 may identify the solution as being generated by the OCR tool based on a construction technique used to generate the challenge-response test. For example, security device 240 may generate a CAPTCHA using one or more construction techniques, may receive an incorrect solution to the CAPTCHA, and may identify that the incorrect solution was generated by the OCR tool based on information, included in the incorrect solution, that may be expected to be included in any incorrect solution generated by the OCR tool (e.g., as discussed above regarding the various construction techniques).

In some implementations, security device 240 may store information associated with identifying the incorrect solution as being generated by the OCR tool. For example, security device 240 may identify the incorrect solution as being generated by the OCR tool, and security device 240 may store information (e.g., an incident report) associated with the incorrect solution (e.g., information identifying client device 210, information associated with the request, information identifying the construction techniques used to generate the CAPTCHA associated with the incorrect solution, information associated with the malicious activity, etc.).

As further shown in FIG. 6, process 600 may include protecting a server device from the client device (block 650). For example, security device 240 may protect server device 230 from client device 210. In some implementations, security device 240 may protect server device 230 when security device 240 identifies the incorrect solution as being generated by the OCR tool. Additionally, or alternatively, security device 240 may protect server device 230 from client device 210 when security device 240 receives information, indicating that security device 240 may protect server device 230, from another device (e.g., server device 230).

In some implementations, security device 240 may protect server device 230 by generating and providing another challenge-response test. For example, security device 240 may identify the incorrect solution, associated with a first CAPTCHA, as being generated by the OCR tool, may receive another request from client device 210, may generate a second CAPTCHA using one or more construction techniques, and may provide the second CAPTCHA to client device 210. As another example, security device 240 may identify the incorrect solution, associated with a first CAPTCHA, as being generated by the OCR tool, may generate a second CAPTCHA (e.g., using the same or different construction techniques) and may provide the second CAPTCHA to client device 210. In this example, security device 240 may verify that the incorrect solution to the first CAPTCHA was generated by the OCR tool (e.g., when an incorrect solution, associated with the second CAPTCHA, is received by security device 240 and identified as being generated by the OCR tool).

In some implementations, security device 240 may protect server device 230 from client device 210 by requiring client device 210 to solve multiple additional challenge-response tests after a first incorrect solution is received from client device 210. For example, security device 240 may identify the first incorrect solution, associated with a first CAPTCHA, as being generated by the OCR tool, may generate a second CAPTCHA using one or more different construction techniques (e.g., different construction techniques than the construction techniques used to generate the first CAPTCHA), and may provide the second CAPTCHA to client device 210. Security device 240 may generate and provide a third CAPTCHA when security device 240 receives a second solution associated with the second CAPTCHA (e.g., after client device 210 provides the first incorrect solution, client device 210 may be required to solve the second CAPTCHA and the third CAPTCHA before being permitted to send the request to server device 230).

In some implementations, security device 240 may protect server device 230 from client device 210 by preventing client device 210 from communicating with server device 230. For example, security device 240 may identify the solution as being generated by the OCR tool, and security device 240 may block a request, provided by client device 210 and intended for server device 230, from being sent to server device 230 (e.g., without generating an additional CAPTCHA).

Additionally, or alternatively, security device 240 may protect server device 230 from client device 210 by limiting the quantity of requests that may be sent to server device 230 from client device 210. For example, security device 240 may identify the solution as being generated by the OCR tool, and security device 240 may determine that client device 210 may submit a limited quantity of requests to server device 230 during a particular period of time (e.g., one request per minute, etc.).

Additionally, or alternatively, security device 240 may protect server device 230 based on information, associated with server device 230, stored by security device 240. For example, security device 240 may store information that identifies one or more security measures associated with server device 230 (e.g., a user, associated with server device 230, may provide information indicating a manner in which security device 240 may protect server device 230).

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7A:
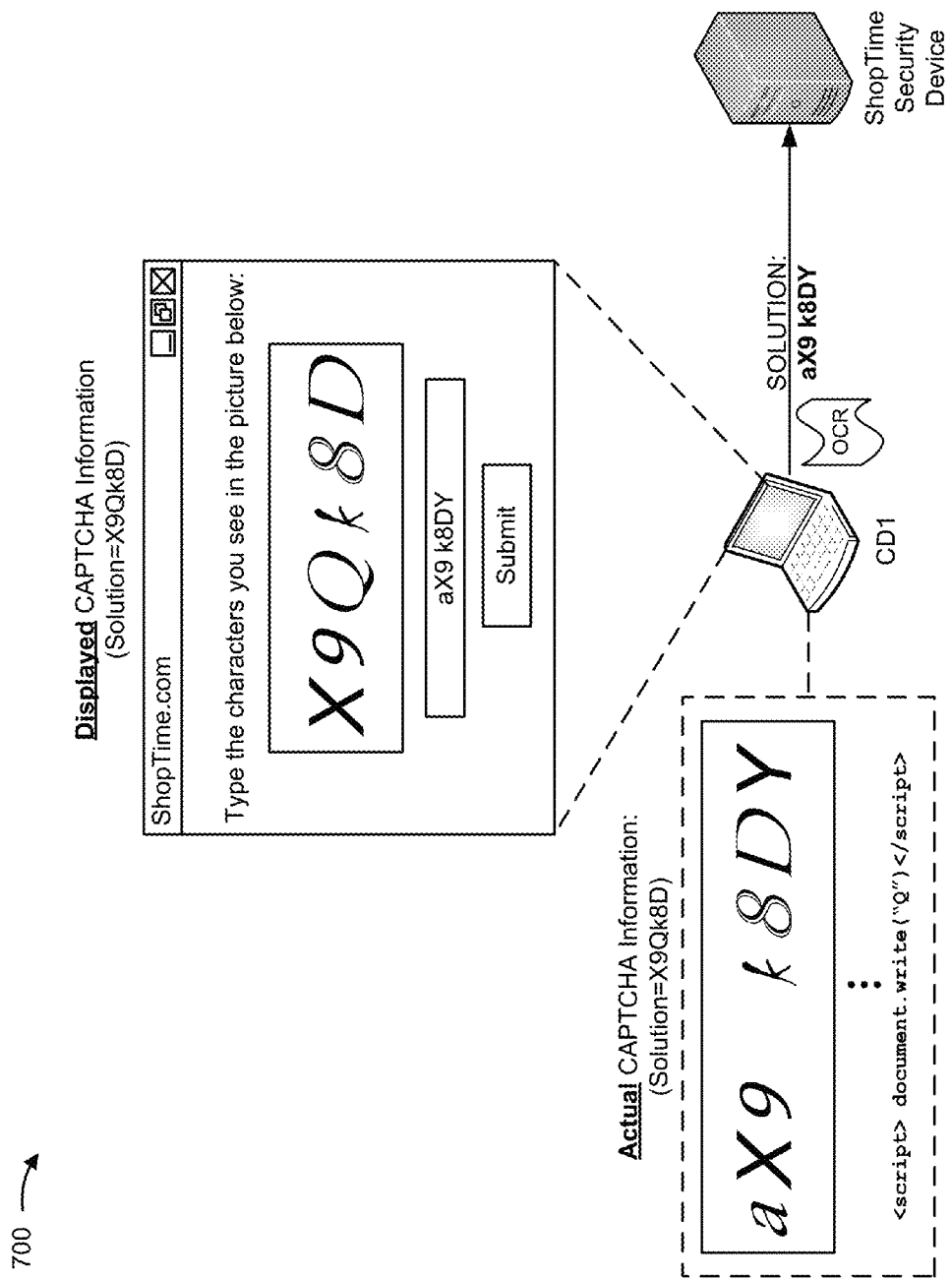
FIGS. 7A and 7B are diagrams of an example implementation relating to the example process shown in FIG. 6.
Figure 7B:
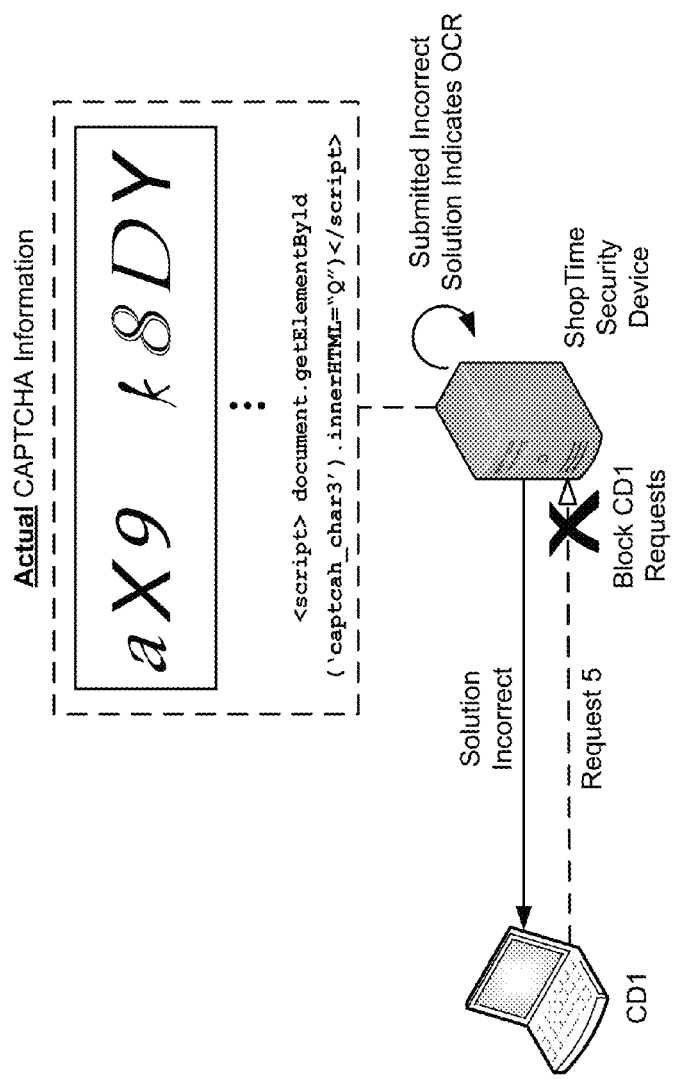

FIGS. 7A and 7B are diagrams of an example implementation 700 relating to the example process 600 shown in FIG. 6. For the purposes of example implementation 700, assume that a ShopTime security device has generated and provided a CAPTCHA to a device engaging in a malicious activity, CD1. Further, assume that CD1 is configured to attempt to automatically determine a solution to the CAPTCHA using an OCR tool (e.g., without user interaction).

As shown in FIG. 7A, actual CAPTCHA information, associated with the CAPTCHA, may include information associated with a string of characters included in an image (e.g., "aX9 k8DY"), information associated with a character (e.g. "Q") that is configured (e.g., using a script) to appear in a gap included in the string of characters included in the image, and encrypted information that identifies a solution to the CAPTCHA ("X9Qk8D"). As further shown, CD1 may display the CAPCTHA image. As shown, the CAPTCHA image that is displayed may indicate that the correct solution to the CAPTCHA is "X9Qk8D" (e.g., the "a" and the "Y" may be hidden when the CAPTCHA is displayed, the "Q" may be displayed between the "9" and the "k").

As further shown in FIG. 7A, CD1 may execute an OCR tool in an attempt to determine the solution the CAPTCHA. As shown, the OCR tool may determine that the solution to the CAPTCHA is "aX9 k8dY" (e.g., the OCR tool may read the entire string of character included in the image and may not be capable of determining that the "Q" is part of the solution). As further shown, CD1 may submit the incorrect solution to the ShopTime security device.

As shown in FIG. 7B, the ShopTime security device may determine (e.g., based on the encrypted information included in the CAPTCHA) that the solution, provided by CD1, is incorrect. As further shown, the ShopTime security device may store information that identifies the CAPTCHA, and may determine that the incorrect solution, provided by CD1, was generated using an OCR tool (e.g., since the entire string of characters "aX9 k8DY" was submitted, including characters not displayed via CD1, and since the solution did not include the "Q" that was displayed via CD1). As further shown, the ShopTime security device may notify CD1 that the solution is incorrect, and the ShopTime security device may protect the ShopTime server device by blocking requests from CD1 (e.g., by blocking request 5, by blocking future requests, etc.).

As indicated above, FIGS. 7A and 7B are provided merely as an example. Other examples are possible and may differ from what was described with regard to FIGS. 7A and 7B.

Implementations described herein may allow a security device, associated with a server device that hosts an application, to generate a challenge-response test using one or more construction techniques intended to prevent an OCR tool from correctly solving the challenge-response test. Implementations described herein may also allow the security device to detect that the OCR tool was used to provide an incorrect solution to the challenge-response test (e.g., and the security device may protect the server device, accordingly).

The foregoing disclosure provides illustration and description, but is not intended to be exhaustive or to limit the implementations to the precise form disclosed. For example, while implementations described herein refer to identifying a request as being associated with a malicious activity prior to generating a challenge-response test, the challenge-response test may also be generated, in the manner described above, without identifying the request as being associated with a malicious activity (e.g., the challenge-response may test may be generated when a client device is engaging in a sensitive transaction, such as signing up for a web mail account, etc.) Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed:

1. A method comprising:
   storing, by a security device, information associated with one or more construction techniques;
   receiving, by the security device and from a client device, a request associated with a particular website;
   identifying, by the security device, one or more other requests received from the client device and associated with the particular website,
      the one or more other requests being received prior to receiving the request;
   determining, by the security device, that the request is associated with malicious activity based on the request and the one or more other requests;
   randomly selecting, by the security device, the one or more construction techniques that are to be used to generate a challenge-response test;
   generating, by the security device and by using the one or more construction techniques, the challenge-response test based on determining that the request is associated with malicious activity; and
   providing, by the security device, the challenge-response test to the client device.

2. The method of claim 1, where determining that the request is associated with malicious activity comprises:
   determining a quantity of requests received from the client device based on the request and the one or more other requests, and
   determining that the request is associated with malicious activity based on the quantity of requests.

3. The method of claim 2, where determining that the request is associated with malicious activity based on the quantity of requests comprises:
   determining that the quantity of requests satisfies a threshold, and
   determining that the request is associated with malicious activity based on determining that the quantity of requests satisfies the threshold.

4. The method of claim 2, where determining the quantity of requests comprises:
   determining the quantity of requests received from the client device within a particular period of time based on the request and the one or more other requests.

5. The method of claim 1, where receiving the request associated with the particular website comprises:
   receiving the request associated with the particular website before a server device that hosts the particular website receives the request.

6. The method of claim 1, where the challenge-response test includes encrypted information that identifies a correct solution.

7. The method of claim 1, where the challenge-response test includes a character that an optical character recognition (OCR) program is not capable of recognizing.

8. The method of claim 1, where generating the challenge-response test comprise:
   overlaying multiple images to create the challenge-response test.

9. A system comprising:
   one or more processors, implemented at least partially in hardware, to:
      store information associated with one or more construction techniques;
      receive, from a client device, a request associated with a particular website;
      identify one or more other requests received from the client device and associated with the particular website,
         the one or more other requests being received prior to receiving the request;
      randomly select the one or more construction techniques that are to be used to generate a challenge-response test;

generate, using the one or more construction techniques, the challenge-response test based on the request and the one or more other requests; and provide the challenge-response test to the client device.

10. The system of claim 9, where, when generating the challenge-response test, the one or more processors are to:
   determine a score based on the request and the one or more other requests,
   determine that the request is associated with malicious activity based on the score, and
   generate the challenge-response test based on determining that the request is associated with malicious activity.

11. The system of claim 9, where the one or more processors are further to:
   store information identifying the request as being associated with malicious activity.

12. The system of claim 9, where the challenge-response test includes a question to be answered by a user of the client device.

13. The system of claim 9, where, when generating the challenge-response test, the one or more processors are to:
   generate the challenge-response test by creating an animation using two or more images.

14. The system of claim 9, where, when generating the challenge-response test, the one or more processors are to:
   generate the challenge-response test by embedding a first CAPTCHA inside of a second CAPTCHA.

15. The system of claim 9, where, when randomly selecting the one or more construction techniques, the one or more processors are to:
   select the one or more construction techniques based on information associated with the client device.

16. A non-transitory computer-readable medium storing instructions, the instructions comprising:
   one or more instructions that, when executed by at least one processor, cause the at least one processor to:
      store information associated with one or more construction techniques;
      receive, from a client device, a request associated with a particular website;
      identify one or more other requests received from the client device and associated with the particular website,
         the one or more other requests being received prior to receiving the request;
      randomly select the one or more construction techniques that are to be used to generate a challenge-response test;
      generate, using the one or more construction techniques, the challenge-response test based on the request and the one or more other requests; and
      provide the challenge-response test to the client device.

17. The non-transitory computer-readable medium of claim 16, where the one or more instructions to generate the challenge-response test comprise:
   one or more instructions that, when executed by the at least one processor, cause the at least one processor to:
      determine that the request is associated with malicious activity based on the request and the one or more other requests, and
      generate the challenge-response test based on determining that the request is associated with malicious activity.

18. The non-transitory computer-readable medium of claim 17, where the one or more instructions to determine that that the request is associated with malicious activity comprise:
   one or more instructions that, when executed by the at least one processor, cause the at least one processor to:
      determine a quantity of requests received from the client device based on the request and the one or more other requests,
      determine that the quantity of requests satisfies a threshold, and
      determine that the request is associated with malicious activity based on determining that the quantity of requests satisfies the threshold.

19. The non-transitory computer-readable medium of claim 16, where the instructions further comprise:
   one or more instructions that, when executed by the at least one processor, cause the at least one processor to:
      forward the one or more other requests to a server that hosts the particular website before providing the challenge-response test to the client device.

20. The non-transitory computer-readable medium of claim 16, where the challenge-response test includes encrypted information that identifies a correct solution.

* * * * *